United States Patent [19]

Lüscher

[11] 4,017,014
[45] Apr. 12, 1977

[54] APPARATUS FOR SENSING NOTCHES

[75] Inventor: René Lüscher, Regensdorf, Switzerland

[73] Assignee: Gretag Aktiengesellschaft, Regensdorf, Switzerland

[22] Filed: Jan. 23, 1976

[21] Appl. No.: 651,619

[30] Foreign Application Priority Data

Jan. 30, 1975 Switzerland .................. 1126/75

[52] U.S. Cl. ............................. 226/45; 200/61.14
[51] Int. Cl.² ............................. B65H 25/02
[58] Field of Search ............ 226/45, 11, 33, 43; 200/61.14, 61.18

[56] References Cited

UNITED STATES PATENTS

| 1,488,512 | 4/1924 | Outrey | 226/45 X |
| 1,950,692 | 3/1934 | Owens | 226/49 |
| 2,011,272 | 8/1935 | Duggan | 200/61.14 |
| 2,166,551 | 7/1939 | Perry | 226/45 X |
| 3,696,981 | 10/1972 | Levy | 226/11 |

*Primary Examiner*—Richard A. Schacher
*Attorney, Agent, or Firm*—Pierce, Scheffler & Parker

[57] ABSTRACT

A device for sensing notches in an edge of a longitudinally transported film strip has a two-armed lever pivoted at a point to one side of the film path to deflect in the film plane. One arm carries at its end a spring biased roller which rotates freely against the moving unnotched film edge but which is biased into engagement with a notch to deflect the lever. The other lever arm is contacted by the actuating button of a microswitch the internal spring of which biases the lever to a quiescent position. A preselected deflection of the lever from this position actuates the microswitch to indicate the presence of a notch. Stops limit the deflection of the lever which is essentially normal to the direction of film movement, deflecting from a just obtuse to a just acute angle when entrained by a notch. The microswitch may be replaced by a photoelectric switching arrangement.

15 Claims, 7 Drawing Figures

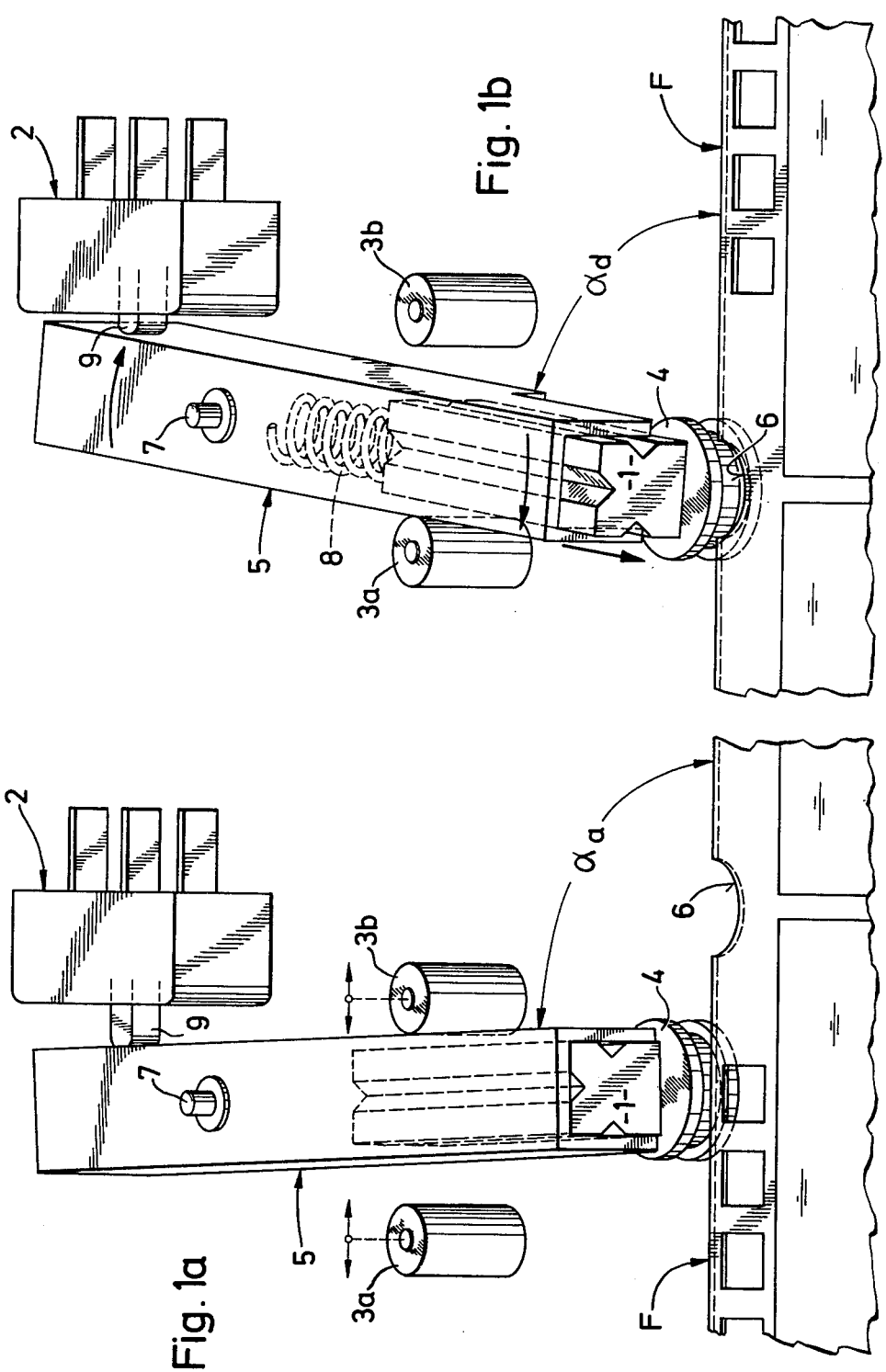

Fig. 2a  Fig. 2b  Fig. 2c
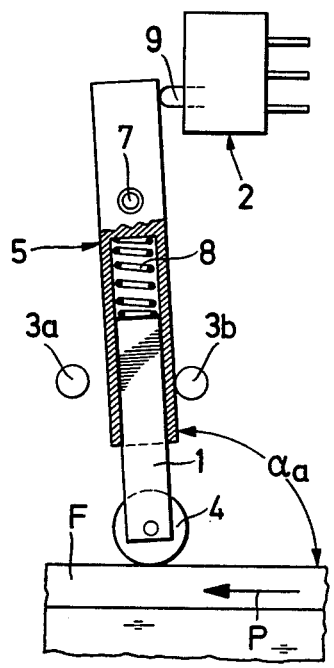
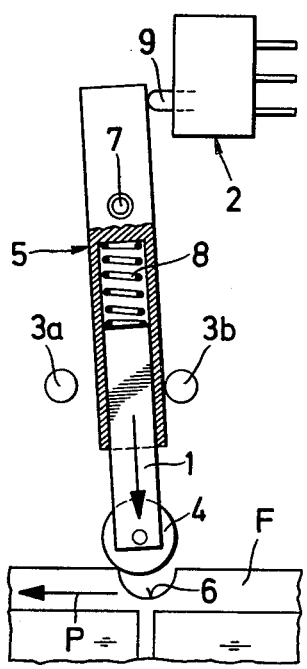
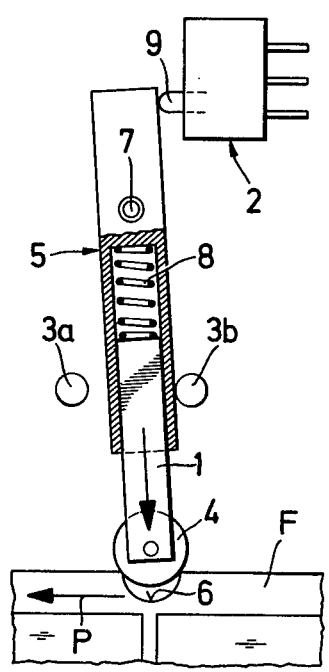
Fig. 2d  Fig. 2e
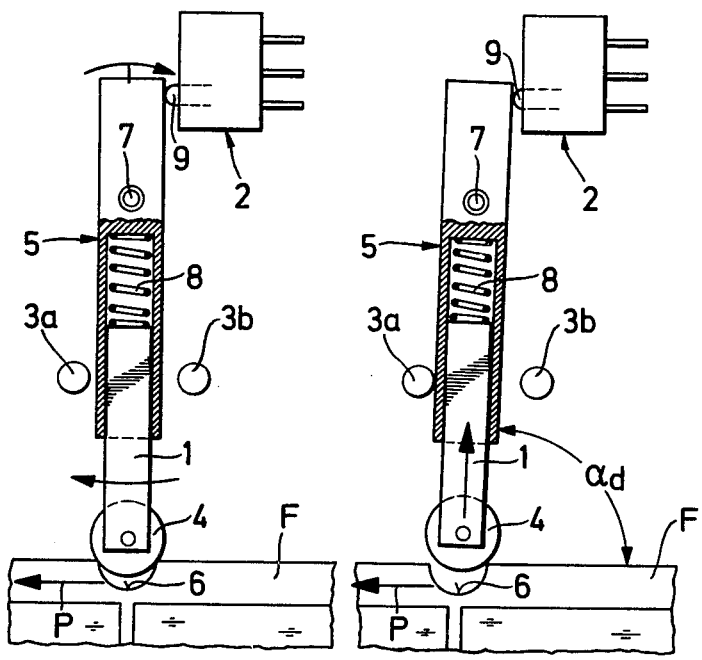

APPARATUS FOR SENSING NOTCHES

FIELD OF THE INVENTION

The invention relates to a sensing device for sensing recesses formed in an edge of a longitudinally movable strip. Such a sensing device is used in apparatus having a path along which a strip is longitudinally transportable. A particular, though not exclusive, application of the invention is an apparatus for processing film strip in which guide notches indicating frames are formed at the edge of the strip and require to be sensed in positioning the film for processing, such as printing from a frame. The invention will be further discussed in relation to its application to film processing apparatus.

In systems for sensing notches associated with the frames on a photographic film strip, one of the difficulties encountered is that the width of the film material for processing is subject to certain variations and the manner of film guidance during the notching operation is not the same as during sensing. For example, there is a relatively considerable variation in the notch depth due to the film width tolerance when the film material is in a guiding contact at the opposite edge during the notching operation. If the film material is guided centrally or if it is in guiding contact on the notching side during the notching operation, difficulties occur in sensing, since the film material is as a rule not guided in the same way during the sensing of notches as it is during the notching operation.

THE PRIOR ART

In one known system, a sensor is mounted vertically above the film plane along the film transport path inwardly from the edge of the film and is supported resiliently and telescopically on the notched edge portion of the film. When a notch arrives, the sensor slides into the notch, the presence of a notch being detected from the changed position of the sensor. To avoid incorrect detection with such a sensing system, two conditions must be satisfied: firstly, the notch depth (from the edge) must be uniform and secondly the notched edge of the strip must be guided accurately, i.e. there must be an exactly constant distance between the edge of the strip and a datum defined by the sensing path. These requirements cannot be met in practice because of variations normally occurring in the width of the film material. Consequently, different notch depths occur during the production of the notches and displacement of the sensing path datum relative to the edge of the strip also occurs due to the variation in film width when the film material is being guided during sensing.

Another known system tries to eliminate these disadvantages by using one edge of the strip as a reference and measuring by means of a sensor bearing operatively against the notched edge of the film material. A system of this kind is described, for example, in Swiss Patent Specification 551,915. The sensor is mounted vertically above the plane of the film material and comprises a lever, the angular position of which is changed when notches occur. The lever bears resiliently against the edge of the strip after the style of a measuring rod. Although this system provides the possibility of having an adjustable threshold value to be reached before indicating a notch in order to exclude perforation damage from detection, the disadvantage of this system is that it is complicated and expensive.

Another known system relates to a camera or photographic device in which locking of the film transport is done in co-operation with sensing notches in the film. Here a locking element in the form of a film sensing lever bears against the side edge of the film under spring pressure and drops into or engages in a notch when the same arrives and is entrained some distance in the engaged state when the film is advanced, the element then inhibiting further advance of the film by co-operating with a locking pawl and returning to its initial position by the action of a tension spring once it has disengaged from the notch in the film. A disadvantage of this system is that it does not meet the requirements of modern sensing sytems in respect of life expectancy and frequency of actuation.

Another known system is optical using photoelectric cells. Two or more photoelectric cells and a light source are so disposed adjacent the film transport path that the cells are activated only when a notch in the edge of the film of a pre-selected geometry allows light to reach them. In the case of standard notches, for example, of semi-circular shape, the correct width and depth of the notches can be accurately sensed by means of three photoelectric cell units, two being adjusted to the notch start and finish points at the edge of the strip and one to the base of the notch, so that faulty detection occurring, for example, on damaged perforations, is substantially eliminated. The fact that the system is very dependent on the density of the emulsion of the film material for sensing is a disadvantage, however. It is well known that masked film material has approximate densities of 1.0 in blue, i.e. where a film edge is to be scanned by means of a photoelectric cell there is a considerable difference between the edge of a non-notched film material and a notch in respect of light permeability, so that it is a simple matter to detect a notch on the above-described principle. In the case of unmasked material having a density of 0.2 in blue, the difference criterion between the edge of the film material and a notch is much less and consequently there is an increase in the error frequency in detecting notches.

SUMMARY OF THE INVENTION

The object of the invention is to obviate the disadvantages of the various system discussed above but as already mentioned the invention is not restricted to sensing notches in a film strip.

Broadly stated, the invention provides in apparatus having a path along which a strip is longitudinally movable, a sensing device located at a point along said path for sensing recesses in an edge of the moving strip comprising: a lever mounted to a pivot which is to one side of said path and at right angles to the plane of the strip at said point; first resilient means urging said lever into a quiescent angular position about said pivot; means carried by said lever to engage recesses in one edge of the strip moving past said point; second resilient means for urging said engagement means to bear against said one edge of the strip and to move the said engagement means into engagement with a recess when it arrives at said point whereby said lever deflects about said pivot from said quiescent angular position upon continuing movement of the engaged recess; and switching means actuable upon said lever reaching a pre-selected deflection from said quiescent angular position to indicate the presence of a recess.

BRIEF DESCRIPTION OF THE DRAWING

The invention and its preferred features will now be further explained with reference to an embodiment illustrated, by way of example, in the accompanying drawing in which:

FIGS. 1a and 1b show diagrammatically and in a perspective view a sensing device of the invention in its un-operated (quiescent) and operated states respectively; and FIGS. 2a and 2e show in plan view five stages in a cycle of operation in sensing a notch in the edge of a film strip, the film plane lying in the plane of the drawing.

The sensing device shown in the FIGS. is mounted in a film processing apparatus the nature of which is not relevant to an understanding of the invention and which is not shown in order to avoid cluttering the figures. The apparatus includes a film transport path along which a film strip F is moved longitudinally from right to left, and the sensing device of the invention is disposed at a point along this path.

The sensing device illustrated comprises a two-armed lever 5 pivotable about a pivot 7 mounted at right angles to the plane of film F and to one side of the film transport path. The lever is deflectable about pivot 7 between two stops 3a and 3b. One arm, the forward arm as seen in FIGS. 1a and 1b, has a longitudinal opening therein and an elongate member 1 is slidably guided inside the forward arm of lever 5, a spring 8 (FIG. 2) being mounted in the opening to urge the member 1 longitudinally outwardly of the lever arm. The forward end of member 1 carries a roller 4 which is urged under the action of spring 8 to bear against one edge of the film F, the roller being mounted to be freely rotatable as the unnotched film edge moves therepast. The rearward arm of lever 5 bears against the actuating button 9 of a fixedly mounted microswitch 2. The button 9 is biased outwardly by the usual internal spring (not shown) contained within the microswitch. This biasing force is thus transmitted to lever 5 to urge it against the stop 3b which defines an un-operated or quiescent position of lever 5 as seen in FIG. 1a. The stops 3a and 3b are preferably made adjustable to adjust the limiting angular position of the lever 5 as is discussed below.

The operation of the device will be described with reference to FIGS. 1 and 2 in which FIGS. 2a and 2d show lever positions corresponding to FIGS. 1a and 1b respectively. The film F, which is to be scanned for notches 6 at the edge is transported in the direction of arrow P (FIG. 2) by a film transport system (not shown). The sensing device is disposed such that the plane in which the lever 5 deflects approximately coincides with the film plane and the roller 4 runs along the edge of the film under the pressure of the spring 8. The adjustment of the stops is such that the angle between the direction of movement P taken from the incoming part of the film (i.e. to the right in the figures) and the lever 5 is an obtuse angle ($\alpha_a$ in FIGS. 1a and 2a) when the roller 4 runs on non-notched parts of the film edge and the lever bears against the stop 3b; and is an acute angle ($\alpha_d$ in FIGS. 1b and 2d) when the lever abuts the stop 3a after the roller has engaged in a notch and caused the lever to deflect. An angle of $\alpha_a$ equal to $91°-95°$ has proved suitable for the first, un-operated or quiescent position in practice (lever on stop 3b), and an angle of $\alpha_d$ equal to $85°-89°$ for the second operated position (lever on stop 3a) — these angles being measured from the incoming side of the film in each case.

More generally the angle can be said to be measured from direction of movement on the incoming side of the film to a line joining the pivot 7 and the location at which the roller 4 bears on the film edge. In the illustrated embodiment this line coincides with the longitudinal axis of the lever 5. It will be realised from the angles quoted that preferably the extent of deflection of the lever between stops 3b and 3a is limited to not more than 10° the lever being generally normal to the direction of film movement. In the example quoted the lever moves from being slightly to one side of the right angle position (obtuse) to slightly to the other side (acute). More preferably the extent of deflection is limited to the range $3°-6°$. However, it is contemplated that satisfactory operation could be obtained within an angular range of $135°-45°$ as measured from the datum stated above.

Considering now a cycle of operation in the stage of operation shown in FIG. 2a (and FIG. 1a), the roller 4 of the lever 5 is running on a non-notched edge portion of the film F. The button 9 of the microswitch 2, under the action of the internal spring, presses the lever 5 on to the front stop 3b as considered in the direction of film transport, i.e. the lever is in its quiescent position.

In FIG. 2b a notch 6 is arriving at the roller 4, which starts to drop into the notch. The lever position has not yet changed in comparison with FIG. 2a.

In FIG. 2c the roller 4 has just reached the rear edge of the notch 6 with respect to the direction of film transport and has penetrated into the notch to the maximum extent. As it continues to move, the film F entrains the lever, which is deflected toward the back stop 3a against the restoring force of the internal microswitch spring acting on the button 9 as shown in FIG. 2d. The microswitch 2 is actuated by the depression of button 9 by the deflecting lever at a point just prior to the stop 3a being reached. This actuation signals the detection of a notch or the film frame associated therewith. The microswitch is part of a system (not shown) which evaluates the frames, positions them, for example in a printing station, and prints them. Finally the lever comes to rest on stop 3a.

In FIG. 2e, with lever stopped from further deflection the roller 4 is starting to move out of the notch 6. The entrainment force of the notch decreases and the restoring force of the spring of the microswitch button starts to predominate and restores the lever 5 on to the front stop 3b. This completes a full cycle and the sensing mechanism is ready for the detection of another notch (FIG. 2a).

It will be appreciated that other means could be used to bias the film engagement means (roller 4) onto the edge of the film and that a resilient means other than the internal spring of microswitch to be used to provide an angular biasing force on the lever 5. The microswitch could be replaced by a photoelectric switching means in which the lever 5 carries a shutter interposable in the light path directed onto a photocell.

What is claimed is:

1. In apparatus having a path along which a strip is longitudinally movable, a sensing device located at a point along said path for sensing recesses in an edge of the moving strip comprising:
   a lever mounted to a pivot which is to one side of said path and at right angles to the plane of the strip at said point;

first resilient means urging said lever into a quiescent angular position about said pivot;

means carried by said lever to engage recesses in one edge of the strip moving past said point;

second resilient means acting in the longitudinal direction of said lever for urging said engagement means to bear against said one edge of the strip and to move the said engagement means into engagement with a recess when it arrives at said point whereby said lever couples for associated movement with the film and deflects about said pivot from said quiescent angular position upon continuing movement for the engaged recess;

switching means actuable upon said lever reaching a first pre-selected deflection from said quiescent angular position to indicate the presence of a recess; and releasing means acting automatically upon said lever reaching a second pre-selected deflection for moving the said engagement out of engagement with the recess, the first pre-selected deflection being less than the second pre-selected deflection.

2. In apparatus having a path along which a strip is longitudinally movable, a sensing device as claimed in claim 1 in which said lever body portion has an opening extending from an end of the body portion toward said pivot, said element is elongate and is slidably mounted in said opening and said second resilient means acts to urge said element away from said pivot.

3. In apparatus having a path along which a strip is longitudinally movable, a sensing device as claimed in claim 1 in which the angle between the direction of movement of the strip at said point and a line extending through said pivot and the location at which said engagement means bears upon said one strip edge, the angle being measured from the incoming side of the strip approaching said point, is not greater than 135° when said lever is said quiescent angular position and is not less than 45° when said lever is at said first preselected deflection.

4. In apparatus having a path along which a strip is longitudinally movable, a sensing device as claimed in claim 3 in which said line is generally normal to the direction of movement both when said lever is in said quiescent angular position and when said lever is at said first preselected deflection.

5. In apparatus having a path along which a strip is longitudinally movable, a sensing device as claimed in claim 4 in which said first preselected deflection of said lever from said quiescent angular position is not greater than 10°.

6. In apparatus having a path along which a strip is longitudinally movable, a sensing device as claimed in claim 5 in which said first preselected deflection of said lever from said quiescent angular position is in the range of 3°–6°.

7. In apparatus having a path along which a strip is longitudinally movable, a sensing device as claimed in claim 4 in which in said quiescent angular position of said lever, said angle is obtuse, and at said first preselected deflection of said lever said angle is acute.

8. In apparatus having a path along which a strip is longitudinally movable, a sensing device as claimed in claim 1 in which said engagement means comprises a roller mounted to rotate freely against said one edge of the moving strip, and in which said releasing means is a stop means for limiting the deflection of said lever.

9. In apparatus having a path along which a strip is longitudinally movable, a sensing device as claimed in claim 8 in which said lever includes a body portion, an element carrying said roller slidably mounted to said body portion, and in which said second resilient means acts between said body portion and said element.

10. In apparatus having a path along which a strip is longitudinally movable, a sensing device as claimed in claim 1 in which said switching means comprises a microswitch having an actuating button and said first resilient means comprises a spring mounted in the microswitch to bias said actuating button, said actuating button coacting with said lever to transmit the force of said internal microswitch spring to said lever and urge the latter into said quiescent angular position.

11. In apparatus having a path along which a strip is longitudinally movable, a sensing device as claimed in claim 10 in which said lever is two-armed, one arm coacting with said microswitch actuating button and the other arm carrying said engagement means.

12. In apparatus having a path along which a strip is longitudinally movable, a sensing device as claimed in claim 11 in which said other lever arm comprises a body portion and an element slidably mounted on said portion, and in which said engagement means comprises a roller mounted on said element to be freely rotatable when bearing against said one edge of a moving strip, and in which said second resilient means acts between said lever body portion and said element.

13. In apparatus having a path along which a strip is longitudinally movable, a sensing device as claimed in claim 12 comprising first and second stop means between said lever is deflectable, said first stop means defining said quiescent angular position of said lever, and said second stop means limiting deflection of said lever after actuation of said microswitch.

14. In apparatus having a path along which a strip is longitudinally movable, a sensing device as claimed in claim 13 in which said first and second stop means are spaced to allow a deflection of said lever of not more than 10°.

15. In apparatus having a path along which a strip is longitudinally movable, a sensing device as claimed in claim 14 in which in the range of angular position between said stops allowed to said lever, there is a position at which a line joining said pivot to the location at which said roller bears on the moving strip is at a right angle to the direction of movement of said strip.

* * * * *

UNITED STATES PATENT OFFICE
CERTIFICATE OF CORRECTION

PATENT NO. : 4,017,014
DATED : April 12, 1977
INVENTOR(S) : Rene Lüscher

It is certified that error appears in the above-identified patent and that said Letters Patent are hereby corrected as shown below:

Claim 1, column 5, line 13 "for" should read  - of -

Signed and Sealed this

Fourteenth Day of June 1977

[SEAL]

Attest:

RUTH C. MASON
Attesting Officer

C. MARSHALL DANN
Commissioner of Patents and Trademarks